US010997723B2

(12) United States Patent
Akiyama

(10) Patent No.: US 10,997,723 B2
(45) Date of Patent: May 4, 2021

(54) IMAGE FORMING SYSTEM, IMAGE FORMING APPARATUS, AND PROGRAM

(71) Applicant: KONICA MINOLTA, INC., Tokyo (JP)

(72) Inventor: Shinichi Akiyama, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 237 days.

(21) Appl. No.: 16/159,897

(22) Filed: Oct. 15, 2018

(65) Prior Publication Data
US 2019/0139220 A1 May 9, 2019

(30) Foreign Application Priority Data

Nov. 7, 2017 (JP) .............................. JP2017-214283

(51) Int. Cl.
G06T 7/00 (2017.01)
H04N 1/00 (2006.01)
H04N 1/04 (2006.01)

(52) U.S. Cl.
CPC ....... *G06T 7/0014* (2013.01); *H04N 1/00005* (2013.01); *H04N 1/00029* (2013.01); *H04N 1/0408* (2013.01); *G06T 2207/10004* (2013.01); *G06T 2207/10024* (2013.01); *G06T 2207/30144* (2013.01)

(58) Field of Classification Search
CPC ..... G06T 7/0002; G06T 7/0014; G06T 7/001; G06T 2207/30144; G06T 2207/10004; G06T 2207/10024; G06T 2207/10008; G06T 2207/30176; H04N 1/00029; H04N 1/00005; H04N 1/0408
See application file for complete search history.

(56) References Cited

U.S. PATENT DOCUMENTS

| 2004/0212830 | A1* | 10/2004 | Takahashi | G06K 15/1817 358/1.16 |
| 2006/0115127 | A1* | 6/2006 | Hatayama | G06K 9/036 382/112 |
| 2010/0253982 | A1* | 10/2010 | Kasai | B41J 2/155 358/3.26 |
| 2012/0070040 | A1* | 3/2012 | Vans | B41F 33/0036 382/112 |

(Continued)

FOREIGN PATENT DOCUMENTS

JP 2015194484 A 11/2015

*Primary Examiner* — Nay A Maung
*Assistant Examiner* — Jose M Torres
(74) *Attorney, Agent, or Firm* — Buchanan Ingersoll & Rooney PC

(57) ABSTRACT

There is a need to prevent the amount of information about read images from increasing excessively, improve the productivity, and reduce the storage capacity to store read images. There is provided a level setter that sets a level of accuracy for an image inspection process. An inspection image data generator generates inspection image data by using a resolution or a gradation setting corresponding to a level set by the level setter. A comparison image data generator generates comparison image data by using a resolution or a gradation setting corresponding to a level set by the level setter. Lowering a level set by the level setter decreases the amount of the inspection image data and the comparison image data.

6 Claims, 8 Drawing Sheets

(56) References Cited

U.S. PATENT DOCUMENTS

| | | | |
|---|---|---|---|
| 2013/0250316 A1* | 9/2013 | Fujise | B41J 29/393 358/1.9 |
| 2014/0079292 A1* | 3/2014 | Kaneko | H04N 1/00045 382/112 |
| 2014/0079293 A1* | 3/2014 | Kitai | G06T 7/001 382/112 |
| 2015/0269719 A1* | 9/2015 | Kitai | G06T 7/0002 358/474 |

* cited by examiner

| INSPECTION LEVEL | LOOSE | NORMAL | STRINGENT |
|---|---|---|---|
| RESOLUTION | 200 | 400 | 600 |

ORIGINAL IMAGE O1

HIGH-RESOLUTION
IMAGE DATA
(ORIGINAL IMAGE) H1

LOW-RESOLUTION
IMAGE DATA
(ORIGINAL IMAGE) L1

O2  PRINT IMAGE
E

HIGH-RESOLUTION
IMAGE DATA
(PRING IMAGE) H2

LOW-RESOLUTION
IMAGE DATA
(PRING IMAGE) L2

| INSPECTION LEVEL | LOOSE | NORMAL | STRINGENT |
|---|---|---|---|
| GRADATION SETTING | TWO LEVELS OF BLACK AND WHITE | 256 LEVELS OF GRAY | 256 LEVELS OF COLOR |

IMAGE FORMING SYSTEM, IMAGE FORMING APPARATUS, AND PROGRAM

CROSS-REFERENCE TO RELATED APPLICATIONS

The entire disclosure of Japanese Patent Application No. 2017-214283, filed on Nov. 7, 2017, is incorporated herein by reference in its entirety.

BACKGROUND

Technological Field

The present invention relates to an image forming system, an image forming apparatus, and a program to detect a flaw in a print image formed on paper.

Description of the Related Art

Conventionally, there is known an apparatus capable of detecting a flow (so-called spoilage) such as linear or point-like stain or void occurring in a print image formed on paper by an image forming apparatus such as a copier, a printer, or a digital complex machine.

For example, Patent Literature 1 discloses an image inspection apparatus that includes an image reader to read an output result based on image forming output and inspects the output result by comparing a read image read by the image reader with a master image. The image inspection apparatus can set a threshold value used for the image inspection to a user-specified value.

CITATION LIST

Patent Literature

Patent Literature 1: JP 2015-194484 A

SUMMARY

However, the image inspection apparatus disclosed in Patent Literature 1 may cause the amount of information about a read image to be excessively greater than a user-specified threshold value used for the image inspection, namely, the inspection level requested by the user. A process for the inspection may consume too much time and degrade the productivity of the entire apparatus when inspecting the presence or absence of a flaw in each of consecutive print images and storing read images. A large amount of storage may be required to store the read images.

The present invention has been made in consideration of the foregoing. It is an object of the invention to prevent the amount of information about read images from increasing excessively, improve the productivity, and reduce the storage capacity to store read images.

In order to solve the above-mentioned issue and achieve the above-mentioned object, according to an aspect of the present invention, an image forming system reflecting one aspect of the present invention includes: an image former that forms an image on paper based on print data; an inspection image data generator that generates inspection image data from the print data; a reader that generates read image data by reading paper where the image former forms an image; a comparison image data generator that generates comparison image data from the read image data; a flaw inspector that performs an image inspection process to inspect a flaw in an image formed on paper by comparing the inspection image data with the comparison image data; and a level setter that sets a level of accuracy for the image inspection process. The inspection image data generator generates the inspection image data by using a resolution or a gradation setting corresponding to a level set by the level setter. The comparison image data generator generates the comparison image data by using a resolution or a gradation setting corresponding to a level set by the level setter. Lowering a level set by the level setter decreases the amount of the inspection image data and the comparison image data.

Description of the embodiments below will clarify issues, and configuration other than those mentioned above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A and 7B are diagrams illustrating an image inspection process according to the first embodiment, in which FIG. 7A illustrates inspection image data concerning an original image and FIG. 7B illustrates print image read data concerning a print image;

DETAILED DESCRIPTION OF EMBODIMENTS

Hereinafter, one or more embodiments of the present invention will be described in detail with reference to the drawings. However, the scope of the invention is not limited to the disclosed embodiments.

First Embodiment

Overview of the Image Forming System

With reference to FIGS. 1 through 5, the description below explains an overview of the image forming apparatus according to the first embodiment and the image forming system including the image forming apparatus.

Figure 1:
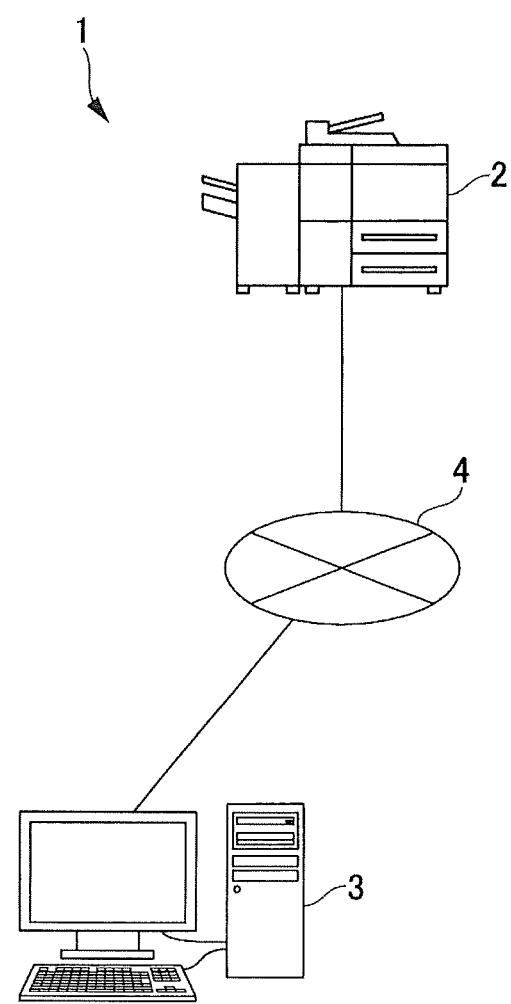
FIG. 1 is a diagram illustrating an overview of an image forming system including an image forming apparatus according to a first embodiment.
Figure 2:
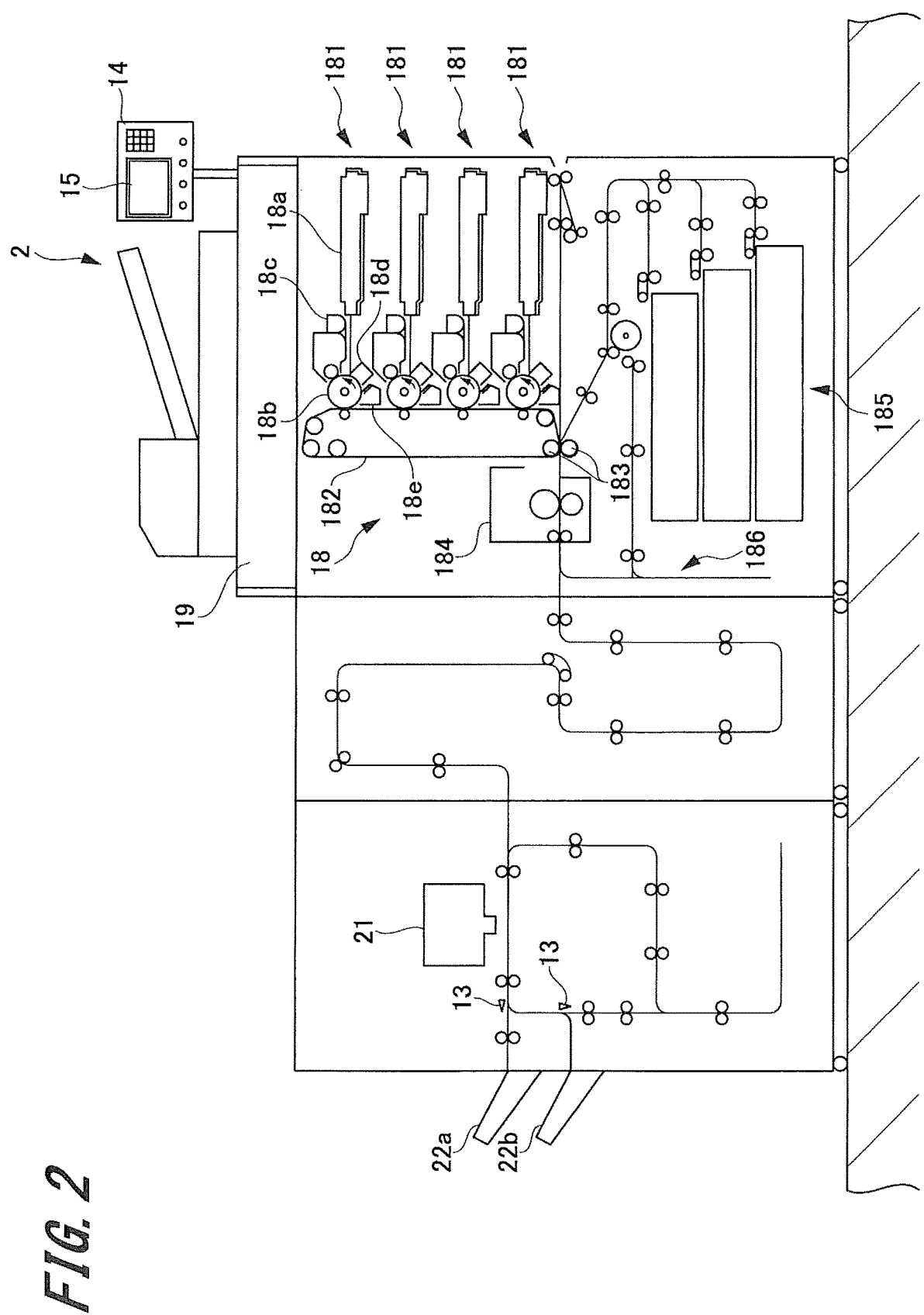
FIG. 2 is a diagram illustrating an overview of the image forming apparatus according to the first embodiment.
Figures 3, 4:
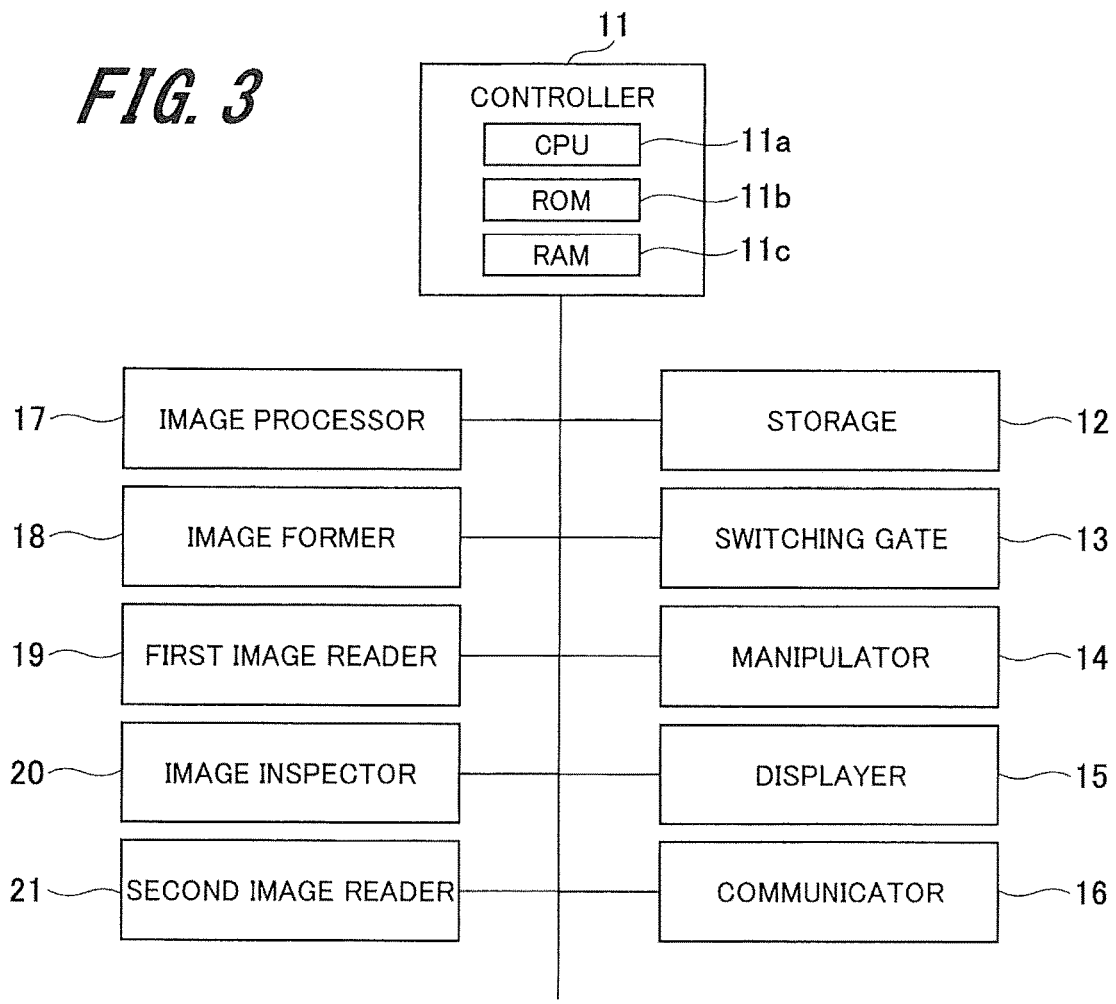
FIG. 3 is a block diagram illustrating a configuration of the image forming apparatus according to the first embodiment.
FIG. 4 is a diagram illustrating a resolution setup table according to the first embodiment.

FIG. 1 is a diagram illustrating an overview of the image forming system including the image forming apparatus. FIG. 2 is a diagram illustrating an overview of the image forming apparatus. FIG. 3 is a block diagram illustrating a configuration of the image forming apparatus. FIG. 4 is a diagram illustrating a resolution setup table. FIG. 5 is a block diagram illustrating a configuration of a client apparatus.

As illustrated in FIG. 1, an image forming system 1 includes a client apparatus 3 and an image forming apparatus 2. The client apparatus 3 transmits document data and instructs printing. The image forming apparatus 2 receives document data and performs printing. These are connected via a communication network 4 such as LAN (Local Area Network) compliant with standards such as Ethernet (registered trademark), token ring, and FDDI (Fiber-Distributed Data Interface). The mode of connection between the image forming apparatus 2 and the client apparatus 3 is not limited thereto but may use USB (Universal Serial Bus) to connect them, for example.

Image Forming Apparatus

As illustrated in FIG. 2, the image forming apparatus 2 includes a first image reader 19, an image former 18, a second image reader 21, and catch trays 22a and 22b. The first image reader 19 reads an image from a document placed on a document table by a user.

The image former 18 forms an image on paper by using a color material such as toner based on scanned image data generated from a document read by the first image reader 19 or document data received from the client apparatus 3.

The second image reader 21 reads a paper surface of the paper that contains a formed image and is placed on a paper transport path downstream of the image former 18. The image forming apparatus 2 performs an image inspection process to detect a flaw (so-called spoilage) such as a linear or point-like stain or void occurring in a print image formed on the paper based on scanned image data generated by the second image reader 21 after reading from the paper surface. The image inspection process will be described in detail later. The paper where the image is formed is ejected to the catch tray 22a or 22b.

As illustrated in FIG. 3, the image forming apparatus 2 includes a controller 11, a storage 12, a switching gate 13, a manipulator 14, a displayer 15, a communicator 16, an image processor 17, the image former 18, the first image reader 19, an image inspector 20, and the second image reader 21. An internal bus connects these with each other.

As illustrated in FIG. 3, the controller 11 includes a CPU (Central Processing Unit) 11a and a memory such as a ROM (Read Only Memory) 11b and a RAM (Random Access Memory) 11c. The CPU 11a reads a program to control operation of the image forming apparatus 2 from the ROM 11b or the storage 12, loads the program into the RAM 11c, and executes it.

The ROM 11b stores a resolution setup table in FIG. 4 that prescribes correspondence relation between an inspection level and a resolution. The resolution setup table prescribes "200" dpi (dots per inch) as a resolution corresponding to inspection level "loose." The resolution setup table prescribes "400" dpi as a resolution corresponding to inspection level "normal." The resolution setup table prescribes "600" dpi as a resolution corresponding to inspection level "stringent." The inspection level signifies a user-specifiable inspection level of the image inspection process. The resolution setup table is used to set resolutions of data when generating the inspection image data and the print image read data to be described later.

The storage 12 is configured as a large-capacity memory including a magnetic disk such as a rewritable hard disk. The storage 12 stores a program capable of being read by the controller 11 and data used to execute the program, for example. The storage 12 also stores inspection image data to be described later.

The switching gate 13 is provided for a paper transport path downstream of the second image reader 21 (see FIG. 2). The switching gate 13 operates on an instruction from the controller 11 and ejects the paper to the catch tray 22a or the catch tray 22b.

The manipulator 14 and the displayer 15 are provided as a user interface at the top of the image forming apparatus 2 as illustrated in FIG. 2.

The manipulator 14 generates a manipulation signal corresponding to the user manipulation and outputs the signal to the controller 11. The manipulator 14 includes a keyboard or a touch panel integrated with the displayer 15, for example.

The displayer 15 displays a manipulation screen-view in accordance with an instruction from the controller 11, for example. The displayer 15 can be provided as LCD (Liquid Crystal Display) or OELD (Organic Electro Luminescence Display), for example.

The communicator 16 communicates with external networked apparatuses such as user terminals, servers, and other image forming apparatuses, for example. The communicator 16 receives document data from the client apparatus 3, for example.

The image processor 17 includes an integrated circuit such as an ASIC (application specific integrated circuit). When the image forming apparatus 2 performs a print job, the image processor 17 applies an image process to the document data received from the client apparatus 3 and generates bit-mapped printout image data. When the image forming apparatus 2 performs a copy job, the image processor 17 applies an image process to scanned image data read and generated by the first image reader 19 and generates bit-mapped printout image data.

The resolution of printout image data generated by the image former 18 is set to the resolution in a print setup concerning a job. The print setup provides a collection of setup values that correspond to a plurality of setup items concerning the image formation and can be configured through the use of a printer driver 38 (to be described) of the client apparatus 3 or the manipulator 14.

For example, when performing a print job or a copy job to output a color document in multiple gradations and full color, the image processor 17 generates bit-mapped image data having a gradation value for each pixel correspondingly to colors such as C (cyan), M (magenta), Y (yellow), and K (black). The gradation value signifies a data value representing the contrasting density of an image. For example, an 8-bit data value represents the contrasting density in 0 to 255 gradations.

When the image inspection process is performed, the image processor 17 generates inspection image data as bit-mapped image data based on the scanned image data or the document data.

The RGB color space or the CMYK color space can be optionally selected as a color space for the inspection image data. The resolution of the inspection image data is set to one of "200" dpi, "400" dpi, and "600" dpi in accordance with the inspection level in the print setup received from the client apparatus 3 or the inspection level settled via the manipulator 14. The generated inspection image data is stored in the RAM 11c of the controller 11 or the storage 12. Inspection level setting will be described later.

The image former 18 forms an image on the paper based on the printout image data generated by the image processor 17. To form a full-color image on the paper, for example, an image comprised of a plurality of colors is formed on the paper in accordance with gradation values for pixels of the colors in the printout image data.

As illustrated in FIG. 2, the image former 18 includes four writing units 181, an interim transfer belt 182, a secondary transfer roller 183, a fixing apparatus 184, a paper feed tray 185, and a reversing mechanism 186. The writing units 181 are serially placed along a belt surface of the interim transfer belt 182. The interim transfer belt 182 rotates so as to be wound around a plurality of rollers. One of the rollers is configured as the secondary transfer roller 183. The secondary transfer roller 183 and the fixing apparatus 184 are placed over a transport path for the paper supplied from the paper feed tray 185. The paper feed tray 185 contains the paper.

The four writing units 181 form images corresponding to the colors of C, M, Y, and K. Each writing unit 181 is configured equally and includes an exposer 18a, a photoreceptor 18b, a developing unit 18c, a charger 18d, and a cleaner 18e.

Each writing unit 181 allows the charger 18d to apply a voltage to the photoreceptor 18b and charge it, and then allows the exposer 18a to irradiate a laser beam in accordance with gradation values for pixels of image data corresponding to the colors of C, M, Y, and K to expose the photoreceptor 18b. Each writing unit 181 allows the developing unit 18c to supply a color material such as toner and develop an electrostatic latent image formed on the photoreceptor 18b, forming images in the colors on the photoreceptor 18b of each writing unit 181.

The images on the photoreceptors 18b are successively transferred to the interim transfer belt 182 so as to be overlapped, forming an image in a plurality of colors on the interim transfer belt 182. After the images are transferred, each writing unit 181 allows the cleaner 18e to remove the color material remaining on the photoreceptor 18b after the transfer.

To form an image on the paper, the paper feed tray 185 feeds the paper and the secondary transfer roller 183 transfers the image on the interim transfer belt 182 to the paper. The fixing apparatus 184 heats and presses the paper to fix the image on the paper. To form an image on both sides of the paper, the reversing mechanism 186 reverses the paper surface and re-transports the paper to the secondary transfer roller 183.

As illustrated in FIG. 2, the second image reader 21 is available as a line sensor or an area sensor placed over the paper transport path. The second image reader 21 reads the paper surface of the paper containing an image formed by the image former 18 and generates scanned image data.

The image inspector 20 includes an integrated circuit such as an ASIC. The image inspector 20 applies various image processes to scanned image data generated by the second image reader 21 to generate bit-mapped print image read data. The resolution of the print image read data is set to one of "200" dpi, "400" dpi, and "600" dpi in accordance with the inspection level in the print setup received from the client apparatus 3 or the inspection level settled via the manipulator 14. The color space for the print image read data is configured equally to the color space for the inspection image data. The generated print image read data is stored in the storage 12. Inspection level setting will be described later.

The image inspector 20 compares the generated print image read data with the inspection image data stored in the RAM 11c or the storage 12 and performs an image inspection process to detect a flaw (so-called spoilage) in the print image. Namely, the image inspector 20 functions as an image configuration control unit. The image inspection process will be described in detail later.

Client Apparatus

Figure 5A:
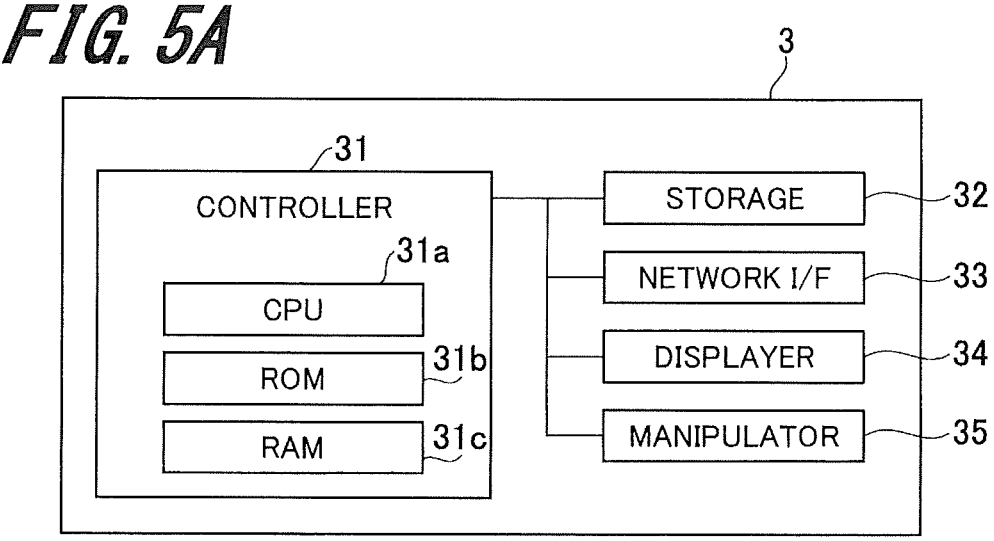
FIGS. 5A and 5B are block diagrams illustrating a configuration of a client apparatus according to the first embodiment.

As illustrated in FIG. 5A, the client apparatus 3 includes a controller 31, a storage 32, a network I/F 33, a displayer 34, and a manipulator 35.

Figure 5B:
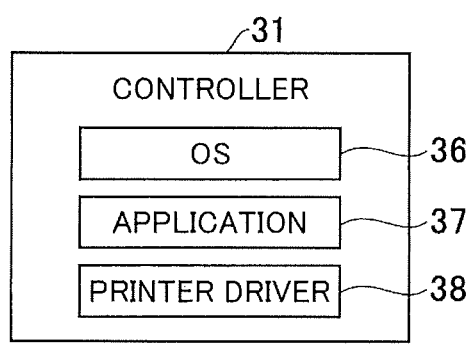

The controller 31 includes a CPU 31a and a memory such as a ROM 31b or a RAM 31c. As illustrated in FIG. 5B, the CPU 31a reads a program to control operation of the client apparatus 3, an OS (Operating System) 36 such as Windows (registered trademark) or Macintosh (registered trademark), an application 37, and a printer driver 38 to control the image forming apparatus 2 from the ROM 31b or the storage 32, loads these into the RAM 31c, and executes them.

The printer driver 38 is comparable to a print control program. The printer driver 38 generates document data by converting data for a document created by using the application 37 into a language (PDL (Page Description Language) such as PCL (Printer Control Language) or PS (Post Script)) the image forming apparatus 2 can interpret. The printer driver 38 transmits the document data along with the print setup to the image forming apparatus 2 and instructs printing.

Specifically, the printer driver 38 allows the displayer 34 to display a print setup screen-view when the application 37 instructs printing. Setup items specifiable in the print setup screen-view include an image inspection setup concerning the image inspection process, a print image resolution, a paper type, a color setup (monochrome, gray scale, or full color), a 2in1 printing option, both side printing, stapling, and punching, for example. A print instruction button is displayed in the print setup screen-view. When this button is activated, the printer driver 38 transmits the print setup as a collection of setup values corresponding to these setup items and the document data as data for a print target to the image forming apparatus. The print image resolution in the print setup is equal to the resolution of an image output to the paper but is different from the resolution that is used for the inspection image data and the print image read data and is settled according to the inspection level. The image inspection setup will be described in detail later.

The storage 32 is configured as an HDD (Hard Disk Drive) or an SSD (Solid State Drive) and stores a program and document data, for example.

The network I/F 33 is configured as an NIC (Network Interface Card) or a modem and transmits document data to the image forming apparatus 2 via a communication network.

The displayer 34 is available as a liquid crystal display (LCD) or an organic electroluminescence (EL) display.

The manipulator 35 includes a mouse or a keyboard, for example, and enables manipulation concerning creation of a document using the application 37 and print setup or a print instruction using the printer driver 38.

Image Inspection Setup

Figure 6:
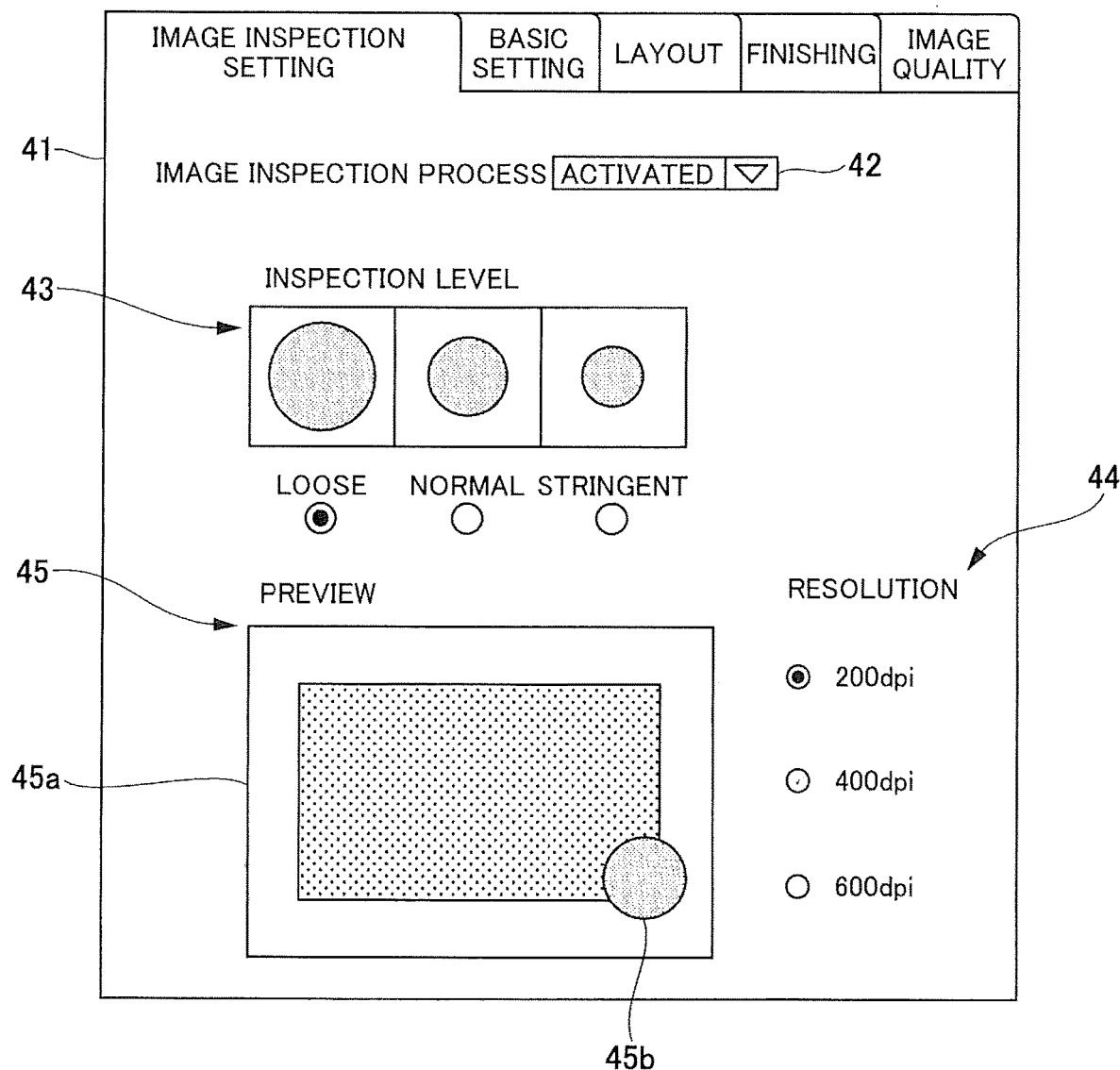
FIG. 6 illustrates a print setup screen-view according to the first embodiment.

With reference to FIG. 6, the description below explains the image inspection setup concerning the image inspection process. FIG. 6 is a diagram illustrating a print setup screen-view according to the first embodiment.

The image forming system 1 according to the present embodiment provides modes of configuring settings concerning the image inspection process performed by the image forming apparatus 2, namely, a mode using the printer driver 38 of the client apparatus 3 and a mode using the manipulator 14 and the displayer 15 of the image forming apparatus 2. The description below explains the mode using the printer driver 38.

Activating the printer driver 38 in the client apparatus 3 displays a print setup screen-view 40 illustrated in FIG. 6. The print setup screen-view 40 displays a plurality of tabs corresponding to various items specifiable in the above-mentioned print setup screen-view. A user manipulates the manipulator 35 to select one of the tabs corresponding to the item to be configured.

An image inspection setup tab 41 includes setup items concerning the image inspection process and can determine whether to perform the image inspection process and settle an inspection level. The image inspection setup tab 41 displays a pull-down menu 42 that determines whether to perform the image inspection process. When the user specifies the pull-down menu 42 by using the manipulator 35, the pull-down menu 42 displays "activated" and "inactivated" as selectable items below, and the user can select one of the items. Selecting "activated" enables the image inspection process to be performed. Selecting "inactivated" disables the image inspection process from being performed.

The image inspection setup tab 41 includes an inspection level setup menu 43 to set an inspection level. The inspection level setup menu 43 is capable of setting three inspection levels "loose," "normal," and "stringent." The inspection level setup menu 43 includes an image (hereinafter also referred to as a "sample flaw image") representing a detectable flaw as an example and a radio button to select the level corresponding to each level.

A resolution setup menu 44 and a preview image 45 are displayed at the bottom of the image inspection setup tab 41. The resolution setup menu 44 is capable of setting the resolution to "200" dpi, "400" dpi, and "600" dpi. The resolution setup menu 44 includes radio buttons to specify the resolutions. Inspection level "loose" is associated with resolution "200." Selecting the radio button for inspection level "loose" selects the radio button for resolution "200." Selecting the radio button for resolution "200" selects the radio button for inspection level "loose." Similarly, inspection level "normal" is associated with resolution "400." Inspection level "stringent" is associated with resolution "600."

When selecting inspection level "stringent" selects the radio button for resolution "600," the radio buttons for resolutions "200" and "400" are dimmed and cannot be selected. When selecting inspection level "normal" selects the radio button for resolution "400," the radio button for resolution "200" is dimmed and cannot be selected. Namely, the resolution setup menu 44 allows a change to the resolutions higher than the resolution once selected by selecting the inspection level but disallows a change to the lower resolutions.

The preview image 45 includes a print preview image 45a concerning a document to be printed and a sample flaw image 45b representing an image flaw detectable in accordance with the specified inspection level or resolution. FIG. 6 illustrates an overlap between the print preview image 45a of a document to be printed and the sample flaw image 45b corresponding to inspection level "loose" and resolution "200."

The preview image 45 can display an enlarged view of a part specified by the user using the manipulator 35. When the print target includes a letter, for example, the letter displayed in the print preview image 45a can be easily compared with the size of the sample flaw image 45b representing a flaw detectable in accordance with the inspection level. The user can therefore easily comprehend an effect of the detectable flaw on the print image.

As above, the print setup screen-view 40 includes the print instruction button (not shown). When this button is specified, the printer driver 38 transmits the determination whether to perform the image inspection process specified in the image inspection setup tab 41, the print setup as a collection of setup values corresponding to various setup items including the inspection level, and the document data as data for a print target to the image forming apparatus 2.

The controller 11 of the image forming apparatus 2 that receives the document data and the print setup stores various setup values of the print setup in a print setup storage area of the RAM 11c when starting a print job based on the received data.

The mode of setting the image inspection process by using the manipulator 14 and the displayer 15 of the image forming apparatus 2 is equal to the above-mentioned mode of using the printer driver 38. Namely, the displayer 15 displays a screen-view similar to the image inspection setup tab 41. However, the mode of setting the image inspection process by using the manipulator 14 and the displayer 15 of the image forming apparatus 2 displays the print preview image of a predetermined sample instead of the print preview image 45a.

Using the manipulator 14, the user issues an instruction to start a copy job supplied with the determination whether to perform the image inspection process and the inspection level. The controller 11 then allows the print setup storage area of the RAM 11c to store various setup values of the print setup including the setup concerning the image inspection process.

Image Inspection Process

Figure 7A:
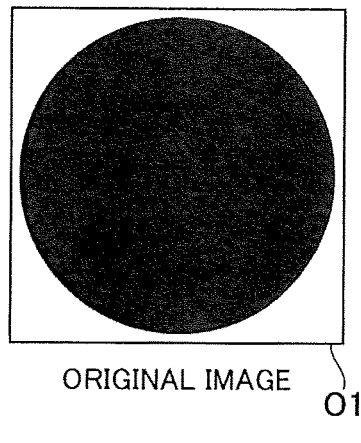
Figure 7A:
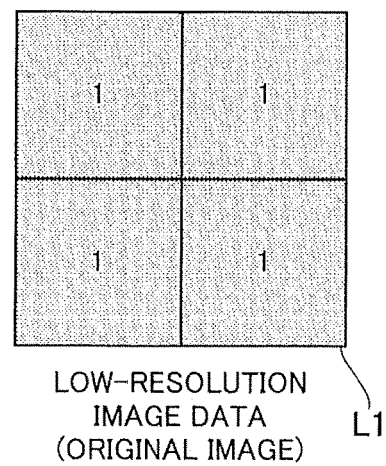
Figure 7B:
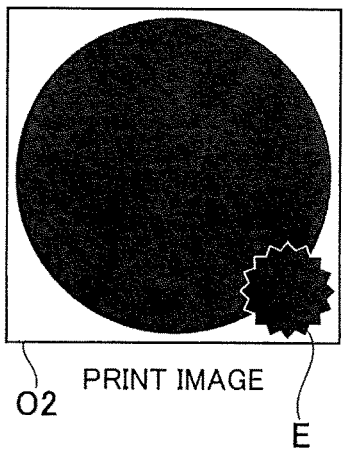
Figure 7B:
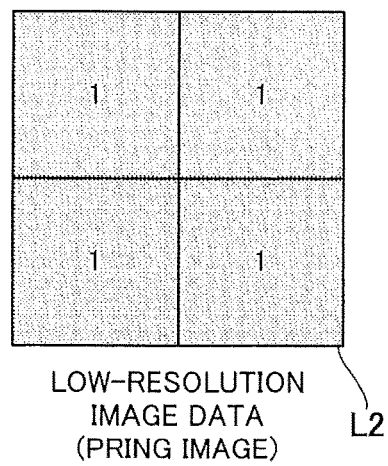

With reference to FIGS. 7A and 7B, the description below explains the image inspection process the image inspector 20 performs. FIGS. 7A and 7B are diagrams illustrating the image inspection process. FIG. 7A is a diagram illustrating inspection image data concerning an original image. FIG. 7B is a diagram illustrating print image read data concerning a print image.

As illustrated in FIGS. 7A and 7B, print image O2 is formed by printing original image O1 and includes flaw E comprised of a stain. The image inspector 20 aligns inspection image data generated by the image processor 17 based on original image O1 with print image read data generated by based on print image O2, compares both data on a pixel basis, and specifies a flaw pixel, namely, a pixel that causes a difference in gradation values. When the inspection image data and the print image read data represent a black-and-white binary image, a flaw pixel is identified by gradation value "0" instead of "1" or gradation value "1" instead of "0." When the inspection image data and the print image read data represent a multiple-value image, a flaw pixel is identified by a gradation value difference whose absolute value is larger than or equal to a predetermined value.

The image inspector 20 detects a flaw in print image O2 when the specified number of flaw pixels is greater than or equal to a predetermined count (specifiable to any value larger than or equal to 0) or when an image comprised of a collection of these flaw pixels matches a predetermined flaw pattern (stain, stripe, or decolorization). The image inspector 20 outputs a signal notifying the detection of a flaw or transmits a command notifying the same to the controller 11.

As illustrated in FIGS. 7A and 7B, the image processor 17 may generate inspection image data H1 that is configured as being black-and-white binary and is given a relatively high resolution. The image inspector 20 may generate print image read data H2 that is configured as being black-and-white binary and is given a relatively high resolution. In this case, the image inspector 20 identifies part of print image read data H2 enclosed in a thick line as flaw pixels. It is therefore possible to detect that print image O2 contains a flaw.

However, the image processor 17 may generate inspection image data L1 that is configured as being black-and-white binary and is given a relatively low resolution. The image inspector 20 may generate print image read data L2 that is configured as being black-and-white binary and is given a relatively low resolution. In this case, the image inspector 20 cannot identify that print image read data L2 contains a flaw pixel. It is therefore impossible to detect that print image O2 contains a flaw.

As above, a flaw is highly accurately detected in the print image when a relatively high resolution is given to the inspection image data and the print image read data compared to a low resolution given to the same. However, giving a relatively high resolution to the inspection image data and the print image read data increases the amount information about the images, increasing loads on a process to generate or compare these images. Inspecting the presence or absence of a flaw in each of successive print images may decrease the productivity of the entire apparatus. A relatively large storage capacity is needed to store the inspection image data.

Figure 8:
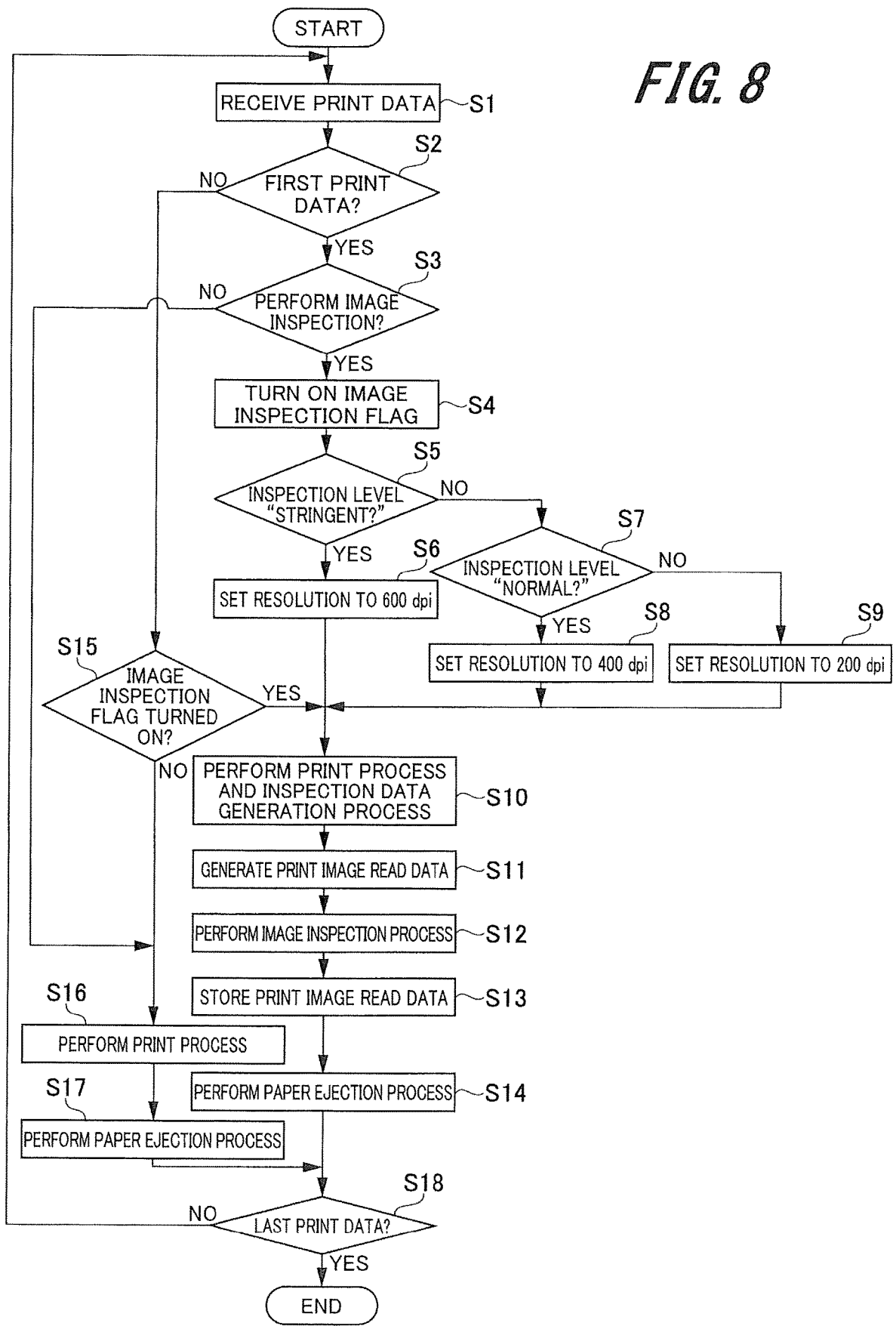
FIG. 8 is a flowchart illustrating an image forming process according to the first embodiment.

With reference to a flowchart in FIG. 8, the description below explains an image forming process (namely, a print job or a copy job) the image forming apparatus 2 performs. FIG. 8 is the flowchart illustrating the image forming process. The controller 11 (its CPU 11a) performs the process in FIG. 8 based on a program stored in the ROM 11b.

The controller 11 receives print data (S1) when the client apparatus 3 transmits the document data and the print setup to start a print job or when a copy job starts based on the print setup configured via the manipulator 14 and the first image reader 19 generates the scanned image data. The "print data" here signifies the document data or the scanned image data to be formed on one side of the paper.

The controller 11 determines whether the print data received at S1 is the first one (data to be formed on the first page) in the started job. If the print data is determined to be the first one (YES at S2), the process determines whether to perform the image inspection (S3). The process determines whether to perform the image inspection process, based on the setup of "executable" or "inexecutable" to enable or disable execution of the image inspection process, the setup being stored in the print setup storage area of the RAM 11c.

If the print setup as to determine whether to perform the image inspection process is set to "executable" and it is determined to perform the image inspection process (YES at S3), the controller 11 changes an image inspection flag provided for the RAM 11c from OFF to ON (S4).

The controller 11 references the print setup storage area of the RAM 11c and determines whether the inspection level specified in the print setup is "stringent" (S5). If "stringent" is determined (YES at S5), the controller 11 sets the resolution to 600 dpi (S6). Specifically, the controller 11 references the resolution setup table (see FIG. 4) in the ROM 11b and stores "600" corresponding to inspection level "stringent" in an setup resolution storage area provided for the RAM 11c. The controller 11 then advances the process to S10.

If "stringent" is not determined at S5 (NO at S5), the controller 11 determines whether the inspection level specified in the print setup is "normal" (S7). If "normal" is determined (YES at S7), the controller 11 sets the resolution to 400 dpi (S8). Specifically, the controller 11 references the resolution setup table (see FIG. 4) in the ROM 11b and stores "400" corresponding to inspection level "normal" in the setup resolution storage area provided for the RAM 11c. The controller 11 then advances the process to S10.

If "normal" is not determined at S7 (NO at S7), the controller 11 sets the resolution to 200 dpi (S9). Specifically, the controller 11 references the resolution setup table (see FIG. 4) in the ROM 11b and stores "200" corresponding to inspection level "loose" in the setup resolution storage area provided for the RAM 11c. The controller 11 then advances the process to S10.

At S10, the controller 11 performs a print process and an inspection data generation process (S10). Specifically, the controller 11 controls the image processor 17 and the image former 18 to generate printout image data based on the print data and form an image on the paper. The controller 11 allows the image processor 17 to generate inspection image data with the resolution corresponding to the value stored in the setup resolution storage area of the RAM 11c.

The controller 11 allows the image inspector 20 to generate print image read data with the resolution corresponding to the value stored in the setup resolution storage area of the RAM 11c based on the scanned image data generated by reading the paper surface using the second image reader 21 (S11).

The controller 11 allows the image inspector 20 to perform the image inspection process (S12). As above, the image inspector 20 performs the image inspection process to compare the inspection image data with the print image read data and inspect the presence or absence of a flaw in the print image formed on the paper.

The controller 11 allows the storage 12 to store the print image read data generated by the image inspector 20 at S11 (S13).

The controller 11 performs a paper ejection process that ejects the paper to the catch tray 22a or the catch tray 22b (S14). In the process, the controller 11 operates the switching gate 13 and ejects the paper to the catch tray 22a when the paper contains a print image in which no flaw is detected by the image inspection process at S12. However, the controller 11 ejects the paper to the catch tray 22b when the paper contains a print image in which a flaw is detected. The controller 11 advances the process to S18.

If the print data is not determined to be the first one at S2 (NO at S2), the controller 11 determines whether the image inspection flag provided for the RAM 11c is ON (S15). If the image inspection flag is determined to be ON (YES at S15), the controller 11 advances the process to S10.

If the image inspection flag is determined not to be ON (NO at S15), the controller 11 advances the process to S16.

If the print setup as to determine whether to perform the image inspection process is set to "inexecutable" and it is determined not to perform the image inspection process at S3 (NO at S3), the controller 11 advances the process to S16.

At S16, the controller 11 performs the print process (S16). Specifically, the controller 11 controls the image processor 17 and the image former 18 to form an image on the paper based on the print data. The controller 11 then advances the process to S17.

At S17, the controller 11 ejects the paper to the catch tray 22a.

The controller 11 determines whether the print process most recently performed at S10 or S16 processes the last print data, namely, whether the print data is to be formed on the last page of the print job or the copy job in process (S18). If the last print data is determined at S18, the controller 11 terminates the image forming process.

If the last print data is not determined at S18, the controller 11 advances the process to S1. The process at S1 and later is then performed on print data on the next page and later.

Effects

There have been described the image forming system 1 and the image forming apparatus 2 according to the embodiment. When the user specifies "loose" as the inspection level, the image forming apparatus 2 generates the inspection image data and the print image read data with the resolution of 200 dpi corresponding to inspection level "loose." When the user specifies "normal" as the inspection level, the image forming apparatus 2 generates the inspection image data and the print image read data with the resolution of 400 dpi corresponding to inspection level "normal." When the user specifies "stringent" as the inspection level, the image forming apparatus 2 generates the inspection image data and the print image read data with the resolution of 600 dpi corresponding to inspection level "stringent." Namely, the inspection image data and the print image read data are generated with the resolution corresponding to the user-specified inspection level. The resolution is configured to decrease as the inspection level is lowered.

It is therefore possible to prevent the amount of information about the inspection image data and the print image read data to be generated from increasing excessively compared to the inspection level needed by the user. For example, the inspection image data and the print image read data are generated to meet a low resolution when the user needs a relatively low inspection level. It is possible to decrease loads on the process to generate these or the image inspection process to compare these. The productivity of the entire apparatus therefore improves when there is a need to inspect the presence or absence of a flaw in each of consecutive print images. It is possible to relatively reduce the storage capacity to store the inspection image data.

The image inspection setup tab 41 (see FIG. 6) of the print setup screen-view 40 displays the print preview image overlapped with the sample flaw image representing a flaw that can be detected by using the inspection level or the resolution specified by the user. The user can comprehend the relation between the image flaw detectable based on the specified inspection level or resolution and an image to be printed and can easily select the necessary inspection level.

Second Embodiment

Figures 9, 10:
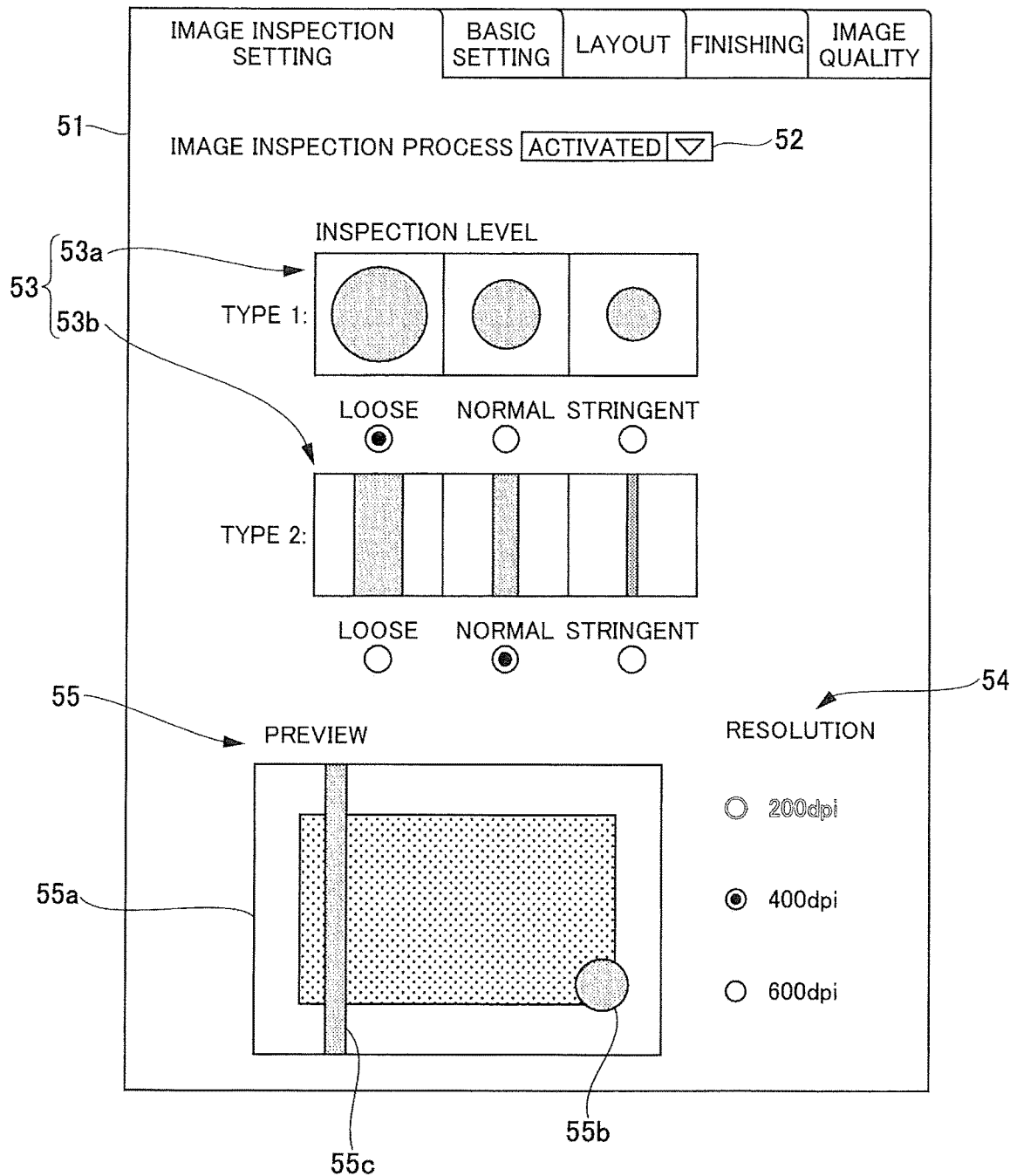
FIG. 9 illustrates a print setup screen-view according to a second embodiment.
FIG. 10 is a diagram illustrating a gradation setup table.

With reference to FIG. 9, the description below explains an overview of the image forming apparatus according to the second embodiment and the image forming system including the image forming apparatus. FIG. 9 illustrates a print setup screen-view according to the second embodiment. The second embodiment differs from the first embodiment in the contents of the print setup screen-view. The description below explains differences between the second embodiment and the first embodiment and omits common points.

According to the present embodiment, starting the printer driver 38 in the client apparatus 3 displays a print setup screen-view 50 illustrated in FIG. 9. The following description of the print setup screen-view 50 omits configurations of the same if they are equal to those of the print setup screen-view 40 according to the first embodiment.

An image inspection setup tab 51 including setup items concerning the image inspection process can determine whether to perform the image inspection process and can set the inspection level. The image inspection setup tab 51 displays a pull-down menu 52 that determines whether to perform the image inspection process. The pull-down menu 52 is equal to the pull-down menu 42 according to the first embodiment and a description is omitted.

The image inspection setup tab 51 displays an inspection level setup menu 53 to set an inspection level. The inspection level setup menu 53 is capable of setting three inspection levels "loose," "normal," and "stringent." The present embodiment can provide the inspection levels for a circular stain or void (TYPE1) and a linear stain or void (TYPE2) as flaw types.

The inspection level setup menu 53 includes a first level setup menu 53a and a second level setup menu 53b. The first level setup menu 53a includes a sample flaw image, namely, an image representing the example of a detectable flaw, concerning a TYPE1 flaw and a radio button used for selection. The second level setup menu 53b includes a sample flaw image concerning a TYPE2 flaw and a radio button used for selection.

A resolution setup menu 54 and a preview image 55 are displayed at the bottom of the image inspection setup tab 51. The resolution setup menu 54 is capable of setting the resolution to "200" dpi, "400" dpi, and "600" dpi. The resolution setup menu 54 includes radio buttons to specify the resolutions. Inspection level "loose" included in the first level setup menu 53a and the second level setup menu 53b is associated with resolution "200." Selecting the radio button for inspection level "loose" selects the radio button for resolution "200." Selecting the radio button for resolution "200" selects the radio button for inspection level "loose." Similarly, inspection level "normal" is associated with resolution "400." Inspection level "stringent" is associated with resolution "600."

Similarly to the resolution setup menu 44 according to the first embodiment, the resolution setup menu 54 dims a radio button and prevents it from being selected if the radio button corresponds to the resolution lower than the resolution that is specified by specifying the inspection level.

The preview image 55 displays sample flaw images 55b and 55c overlapping with a print preview image 55a corresponding to the inspection level specified for the print preview image 55a of a document to be printed in order to be able to comprehend the relation between the image flaw detectable based on the specified inspection level or resolution and an image to be printed.

The inspection level specified in the first level setup menu 53a may differ from the inspection level specified in the second level setup menu 53b. In such a case, the resolution in the resolution setup menu is specified correspondingly to more stringent (higher) one of the specified inspection levels. For example, as illustrated in FIG. 9, when inspection level "loose" is specified in the first level setup menu 53a and inspection level "normal" is specified in the second level setup menu 53b, the resolution setup menu activates resolution "400" associated with inspection level "normal."

Similarly, the inspection level specified in the first level setup menu 53a may differ from the inspection level specified in the second level setup menu 53b. In such a case, the preview image 55 displays a flaw sample corresponding to more stringent (higher) one of the specified inspection levels. For example, as illustrated in FIG. 9, suppose inspection level "loose" is specified in the first level setup menu 53a and inspection level "normal" is specified in the second level setup menu 53b. In such a case, the preview image 55 displays the sample flaw images 55b and 55c corresponding to inspection level "normal."

The print setup screen-view 50 displays a print instruction button (not shown). When this button is specified, the printer driver 38 transmits the determination whether to perform the image inspection process specified in the image inspection setup tab 51, the print setup as a collection of setup values corresponding to various setup items including the inspection level, and the document data as data for a print target to the image forming apparatus 2. When the inspection level specified in the first level setup menu 53a differs from the inspection level specified in the second level setup menu 53b, the transmitted print setup includes more stringent (higher) one of the specified inspection levels. In FIG. 9, inspection level "loose" is specified in the first level setup menu 53a and inspection level "normal" is specified in the second level setup menu 53b. The transmitted print setup therefore includes inspection level "normal."

Similarly to the first embodiment, the displayer 15 displays a screen-view similar to the image inspection setup tab 51 when the manipulator 14 and the displayer 15 of the image forming apparatus 2 are used to set the image inspection process.

As above, the image forming apparatus and the image forming system according to the second embodiment can provide the same function effect as that of the image forming apparatus and the image forming system according to the first embodiment.

The image inspection setup tab 51 of the print setup screen-view 50 displays a plurality of sample flaw images representing a flaw that can be detected by using the inspection level or the resolution specified by the user. It is therefore possible to more easily comprehend the relation between the image flaw detectable based on the specified inspection level or resolution and an image to be printed.

Modifications

The present invention is not limited to the above-mentioned embodiments. It is further understood by those skilled in the art that various applications and modifications may be made in the present invention without departing from the spirit and scope thereof described in the appended claims.

For example, the first and second embodiments have described the mode in which the image forming apparatus 2 generates the inspection image data and the print image read data using the resolution corresponding to the user-specified inspection level. Instead, however, the image forming apparatus 2 may generate the inspection image data and the print image read data using a gradation setting corresponding to the user-specified inspection level.

In this case, the ROM 11b of the controller 11 stores a gradation setup table illustrated in FIG. 10. The gradation setup table specifies "two levels of black and white" as a gradation setting corresponding to inspection level "loose." The gradation setup table specifies "256 levels of gray" as a gradation setting corresponding to inspection level "normal." The gradation setup table specifies "256 levels of color" as a gradation setting corresponding to inspection level "stringent."

The controller 11 stores a gradation setting corresponding to the inspection level of the print setup in the gradation setting storage area of the RAM 11c when a print job or a copy job using the image inspection process starts. The image processor 17 generates the inspection image data corresponding to the gradation setting stored in the gradation setting storage area. The image inspector 20 generates the print image read data corresponding to the gradation setting stored in the gradation setting storage area.

The image forming apparatus 2 according to the above-mentioned modification generates the inspection image data and the print image read data in "two levels of black and white" corresponding to inspection level "loose" when the user specifies "loose" as the inspection level. The image forming apparatus 2 generates the inspection image data and the print image read data in "256 levels of gray" corresponding to inspection level "normal" when the user specifies "normal" as the inspection level. The image forming apparatus 2 generates the inspection image data and the print image read data in "256 levels of color" when the user specifies "stringent" as the inspection level. Namely, the inspection image data and the print image read data are generated in the gradation setting corresponding to the user-specified inspection level. The gradation setting is configured so as to decrease the amount of data about the data generated in the gradation setting as the inspection level is lowered.

Similarly to the first embodiment, it is possible to prevent the amount of information about the inspection image data and the print image read data to be generated from increasing excessively compared to the inspection level needed by the user.

The above-mentioned embodiment has described the mode of setting the three inspection levels but is not limited thereto. For example, there may be provided five inspection levels. In this case, the resolution or the gradation setting corresponding to each inspection level may be configured so as to decrease the amount of information about the data generated based on the setting as the inspection level is lowered.

There has been described the mode of displaying the images concerning the circular stain or void and the linear stain or void as the sample flaw images displayed in the image inspection setup tabs 41 and 51. A sample flaw image concerning other flaw patterns may be displayed. For example, it may be advantageous to display a sample image concerning a print image flaw caused by tearing or folding the paper.

There has been described the mode of ejecting the paper containing the print image with a flaw detected by the image inspection process to the catch tray 22b. Other methods may be used to be able to identify the paper containing the print image with a flaw detected by the image inspection process. For example, it may be advantageous to eject a sheet of paper containing the print image with a flaw detected and a sheet of paper containing the print image with no flaw detected to the same catch tray and insert a blank sheet of paper between those sheets of paper. The same catch tray may be configured to differentiate the position to eject the paper containing the print image with a flaw detected from the position to eject the paper containing the print image with no flaw detected. A page number or a sheet number may be given to the paper containing the print image with a flaw detected by the image inspection process and may be notified to the client apparatus 3 via the printer driver 38 or may be displayed on the displayer 15 of the image forming apparatus 2.

The print preview images 45a and 55a may display a grid containing a series of rectangles one of which represents the range of one pixel corresponding to the specified resolution.

Various tables may be stored in the storage 12 instead of the ROM 11b.

The present invention is applicable to not only color machines but also monochrome machines.

Instead of the printer driver 38 of the client apparatus 3, the other software such as an application installed on the client apparatus 3 may be used for the image inspection setup.

The image forming process including the image inspection process illustrated in FIG. 8 may be performed in units of sheets.

The controller 11 may store the print image read data in the storage 12 by linking the print image read data with a result (the presence or absence of a flaw or the type of a detected flaw) of performing the image inspection process on the data.

The controller 11 may perform a program capable of implementing the function of the image inspector 20 instead of providing the image inspector 20 including integrated circuits such as ASIC.

The second embodiment has described the mode of selecting more stringent (higher) one of the specified inspection levels in the print setup to be transmitted when the inspection level specified in the first level setup menu 53a differs from the inspection level specified in the second level setup menu 53b. Instead, however, it may be advantageous to transmit the print setup including different inspection levels to the image forming apparatus 2 when the inspection level specified in the first level setup menu 53a differs from the inspection level specified in the second level setup menu 53b. In this case, the controller 11 of the image forming apparatus 2 settles the resolution or the gradation setting corresponding to the highest one of the received inspection levels. Alternatively, the controller 11 references the resolution setup table or the gradation setup table, extracts corresponding resolutions or gradation settings, and uses the highest resolution or gradation setting to be configured.

The embodiments can prevent the amount of information about read images from increasing excessively, improve the productivity, and reduce the storage capacity to store read images.

Obviously, it is possible to combine all or part of the above-mentioned embodiments and various modifications within an uncontradicted range.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image forming system, 2 . . . image forming apparatus, 3 . . . client apparatus, 4 . . . communication network, 11 . . . controller, 12 . . . storage, 13 . . . switching gate, 14 . . . manipulator, 15 . . . displayer, 16 . . . communicator, 17 . . . image processor, 18 . . . image former, 19 . . . first image reader, 20 . . . image inspector, 21 . . . second image reader, 22a, 22b . . . catch tray

What is claimed is:

1. An image forming system comprising:
    an image former that forms an image on paper based on print data;
    an inspection image data generator that generates inspection image data from the print data;
    a reader that generates read image data by reading paper where the image former forms an image;
    a comparison image data generator that generates comparison image data from the read image data;
    a flaw inspector that performs an image inspection process to inspect a flaw in an image formed on paper by comparing the inspection image data with the comparison image data; and
    a level setter that sets a level of accuracy for the image inspection process,
    wherein the inspection image data generator generates the inspection image data by using one of a resolution and a gradation setting corresponding to a level set by the level setter;
    wherein the comparison image data generator generates the comparison image data by using one of a resolution and a gradation setting corresponding to a level set by the level setter; and
    wherein lowering a level set by the level setter decreases the amount of the inspection image data and the comparison image data.

2. The image forming system according to claim 1, wherein lowering a level set by the level setter decreases the resolution of the inspection image data and the comparison image data.

3. The image forming system according to claim 1, wherein the gradation setting is available in three types such as two levels of black and white, 256 levels of gray, and 256 levels of color.

4. The image forming system according to claim 1, wherein the flaw inspector is capable of inspecting a plurality of types of image flaws and includes a level specifier that specifies an inspection level for each of the plurality of types of image flaws; and
    wherein the level setter sets the highest one of inspection levels for each of the plurality of types of image flaws specified by the level specifier.

5. An image forming apparatus comprising:
    an image former that forms an image on paper based on print data;
    an inspection image data generator that generates inspection image data from the print data;
    a reader that generates read image data by reading paper where the image former forms an image;
    a comparison image data generator that generates comparison image data from the read image data;
    a flaw inspector that performs an image inspection process to inspect a flaw in an image formed on paper by comparing the inspection image data with the comparison image data; and
    a level setter that sets a level of accuracy for the image inspection process,
    wherein the inspection image data generator generates the inspection image data by using one of a resolution and a gradation setting corresponding to a level set by the level setter;
    wherein the comparison image data generator generates the comparison image data by using one of a resolution and a gradation setting corresponding to a level set by the level setter; and
    wherein lowering a level set by the level setter decreases the amount of the inspection image data and the comparison image data.

6. A non-transitory recording medium storing a computer readable program causing a computer to perform:
    a level acquisition step to acquire a level of accuracy for an image inspection process that inspects a flaw in an image formed on paper by comparing inspection image data with comparison image data;
    an image formation step to form an image on paper based on print data;
    an inspection image data generation step to generate inspection image data from the print data;
    a read step to generate read image data by reading paper where an image is formed;

a comparison image data generation step to generate comparison image data from the read image data; and a flaw inspection step to perform an image inspection process that inspects a flaw in an image formed on paper by comparing the inspection image data with the comparison image data, wherein the inspection image data generation step generates the inspection image data by using one of a resolution and a gradation setting corresponding to a level acquired by the level acquisition step;

wherein the comparison image data generation step generates the comparison image data by using one of a resolution and a gradation setting acquired by the level acquisition step; and wherein lowering a level acquired by the level acquisition step decreases the amount of the inspection image data and the comparison image data.

* * * * *